(12) United States Patent
Booth et al.

(10) Patent No.: US 8,198,764 B2
(45) Date of Patent: Jun. 12, 2012

(54) ARRANGEMENT FOR COOLING OF AN ELECTRICAL MACHINE

(75) Inventors: James Kenneth Booth, Brande (DK); Uffe Eriksen, Horsens (DK); Soeren Gundtoft, Fredericia (DK); Jacob Blach Nielsen, Silkeborg (DK)

(73) Assignee: Siemens Aktiengesellschaft, Munich (DE)

( * ) Notice: Subject to any disclaimer, the term of this patent is extended or adjusted under 35 U.S.C. 154(b) by 290 days.

(21) Appl. No.: 12/606,217

(22) Filed: Oct. 27, 2009

(65) Prior Publication Data

US 2010/0102656 A1 Apr. 29, 2010

(30) Foreign Application Priority Data

Oct. 28, 2008 (EP) .................................... 08018803

(51) Int. Cl.
- *H02K 1/32* (2006.01)
- *H02K 3/24* (2006.01)
- *H02K 5/18* (2006.01)
- *H02K 5/20* (2006.01)
- *H02K 9/00* (2006.01)

(52) U.S. Cl. ............... 310/64; 310/58; 310/59; 310/61; 310/62; 310/65; 310/66

(58) Field of Classification Search ............. 310/58–59, 310/61–62, 64–66; *H02K 1/32, 3/24, 5/18, H02K 5/20, 9/00*

See application file for complete search history.

(56) References Cited

U.S. PATENT DOCUMENTS

| | | | | |
|---|---|---|---|---|
| 3,475,631 A * | 10/1969 | Bollibon et al. | ................. | 310/58 |
| 4,301,386 A * | 11/1981 | Schweder et al. | ............... | 310/59 |
| 4,564,781 A * | 1/1986 | Arnegger | ...................... | 310/208 |
| 7,122,923 B2 * | 10/2006 | Lafontaine et al. | ............. | 310/58 |
| 2005/0035673 A1 * | 2/2005 | Lafontaine et al. | ............. | 310/58 |
| 2005/0258701 A1 * | 11/2005 | Soitu | ............................. | 310/179 |
| 2006/0022529 A1 * | 2/2006 | De Filippis et al. | ............ | 310/58 |
| 2007/0210656 A1 * | 9/2007 | Lafontaine et al. | ............. | 310/58 |
| 2010/0102656 A1 * | 4/2010 | Booth et al. | .................... | 310/64 |

FOREIGN PATENT DOCUMENTS

| EP | 1586769 A2 | 10/2005 |
|---|---|---|
| EP | 1873893 A2 | 1/2008 |

\* cited by examiner

Primary Examiner — John K Kim

(57) ABSTRACT

An air-gap is between a rotor and a stator. The stator comprises a number of stacked laminate-plates. The laminate-plates are positioned and fixed by a structural support and by end-plates in relation to a central-part of the stator to achieve the air-gap. A cavity is formed by the end-plates, the central-part of the stator, the air-gap and an internal surface of the rotor. An air-cooling arrangement is arranged and used to circulate a gaseous medium for cooling purposes inside the cavity.

14 Claims, 2 Drawing Sheets

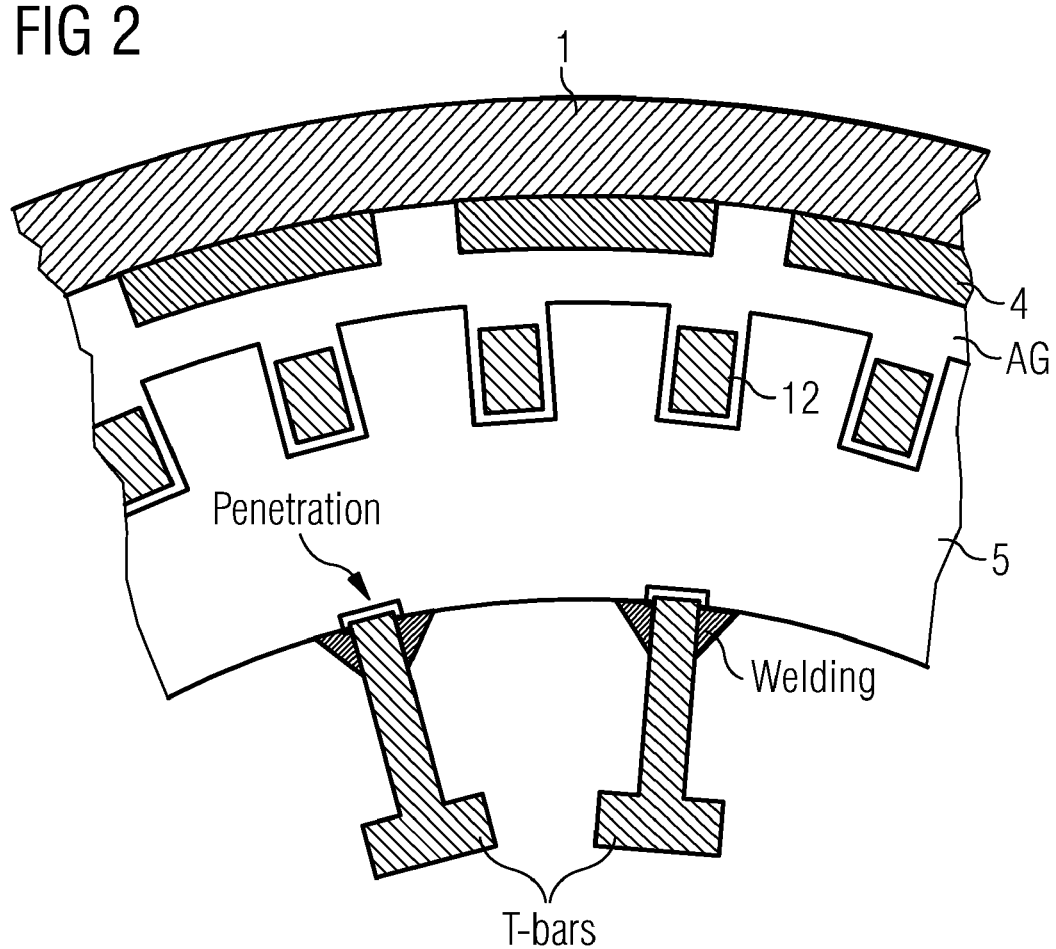

ARRANGEMENT FOR COOLING OF AN ELECTRICAL MACHINE

CROSS REFERENCE TO RELATED APPLICATIONS

This application claims priority of European Patent Office application No. 08018803.0 EP filed Oct. 28, 2008, which is incorporated by reference herein in its entirety.

FIELD OF INVENTION

The invention relates to a cooling-arrangement of an electrical machine.

BACKGROUND OF INVENTION

Electrical machines need cooling-arrangements to dissipate heat, which is generated during its operation by an ohmic resistance, by an iron hysteresis, etc.

Electrical machines needs cooling to dissipate heat, which is generated during its operation by an ohmic resistance, by iron hysteresis, etc.

It is possible to cool a small electrical machine by a heat-transfer from the inside of the machine to its surface.

This is not possible for a large machine, which shows a relatively small surface per power rating and heat generation.

When a machine is installed indoor at a dry atmosphere it is possible to operate the machine without a housing, so a cooling is achieved by the circulation of ambient air through the machine.

But when the machine is installed under harsh conditions, like it is for generators being used in offshore wind-turbines, the electrical machine need to be totally enclosed, so ambient air is not allowed to circulate through the machine. For this application dedicated cooling-systems are required.

SUMMARY OF INVENTION

One very common cooling-method is the circulation of air or another gaseous medium inside the electrical machine, while the cooling-medium is kept cool by a heat-exchanger. This cooling method disadvantageously requires large gas-to-air or gas-to-water heat-exchangers. Furthermore considerable additional power is required to circulate the cooling-medium inside the machine.

Another cooling-method of a generator, which shows a stator and a rotor, is the circulation of a liquid inside cooling-channels on a first side of the stator. This first side to be cooled is opposite to an air gap, which is between the stator and the rotor. The stator shows a number of stacked laminate-plates, which carries metal-windings of stator-coils, so the heat is transferred from the metal-windings through the laminate-plates to the cooling-medium by conduction.

This cooling-method is not as effective as air-cooling, because winding-heads of the coils and the rotor itself is not cooled in the same way.

This cooling method shows the additional disadvantage, that it is difficulty to ensure a good thermal-contact between the laminate-plates of the stator and the cooling-channels.

A difference in thermal-expansion between the laminate-plates of the stator and the cooling-channels leads to small air-gaps between the laminate-plates and the coolant-channels, so the heat-transfer is affected by air negatively.

Additionally there will be an increase of weight because of the coolant-channels, the coolant-liquid and the air-cooling-structure, which is used normally.

It is therefore aim of the invention, to provide an improved arrangement for cooling of an electrical machine like a generator.

This aim is solved by the features of the independent claims. Advantageous embodiments of the invention are described within the subsequent claims.

The inventive arrangement for cooling of an electrical machine comprises a rotor and a stator, while an air-gap is between the rotor and the stator. The stator comprises a number of stacked laminate-plates, which are used to carry metal-windings of a stator-coil.

The laminate-plates are fixed and kept in position by means for structural support. This means for structural support may be a number of "T"-shaped bars or profiles, which penetrates in a preferred embodiment the laminate-plates. The means for structural support are connected with the laminate-plates by welding in a preferred embodiment.

The stacked laminate-plates are positioned by end-plates in relation to a central-part of the stator. So a certain air-gap is achieved by help of the end-plates.

The central-part of the stator extends along the rotation-axis of the rotor.

The end-plates and the structural-support are connected in a preferred embodiment.

A joint cavity is formed by the end-plates, by the central part of the stator and by the internal surface of the rotor.

The electrical machine comprises an air-cooling-arrangement, which is arranged and used to circulate a gaseous medium for cooling purposes inside the joint cavity.

The air-cooling-arrangement comprises a fan in a preferred embodiment to circulate the gaseous medium or to circulate simply air for cooling.

In a preferred embodiment an air-to-liquid-heat-exchanger is located inside the joint cavity, so heat is removed from the cavity by a liquid-cooling-arrangement.

The fan my be coupled or connected with the air-to-liquid-heat-exchanger.

In a preferred embodiment the electrical machine comprises an outer-rotor and an inner-stator arrangement. So the outer-rotor rotates on the outside of the stationary stator.

One or more heat-exchanger like a fan is/are placed at least on one of the end-plates.

During operation air for cooling-purposes is circulated through the air-to-liquid-heat-exchanger.

The inventive arrangement shows a number of advantages:

There is an efficient cooling due to the continuous maintenance of cooled-air, which flow through heat-generating parts of the generator.

The cooling arrangement inside the generator is very simple and therefore requires no additional air or gas flow-channels from ambient to the internal part of the generator than those provided by the structure. Only liquid channels should pass from outside to inside the generator, but the geometric size of these are small compared to air channels.

BRIEF DESCRIPTION OF THE DRAWINGS

The invention will be described in more detail by help of a two figures.

FIG. 2 shows referring to FIG. 1 a detail of the generator G.

DETAILED DESCRIPTION OF INVENTION

Figure 1:
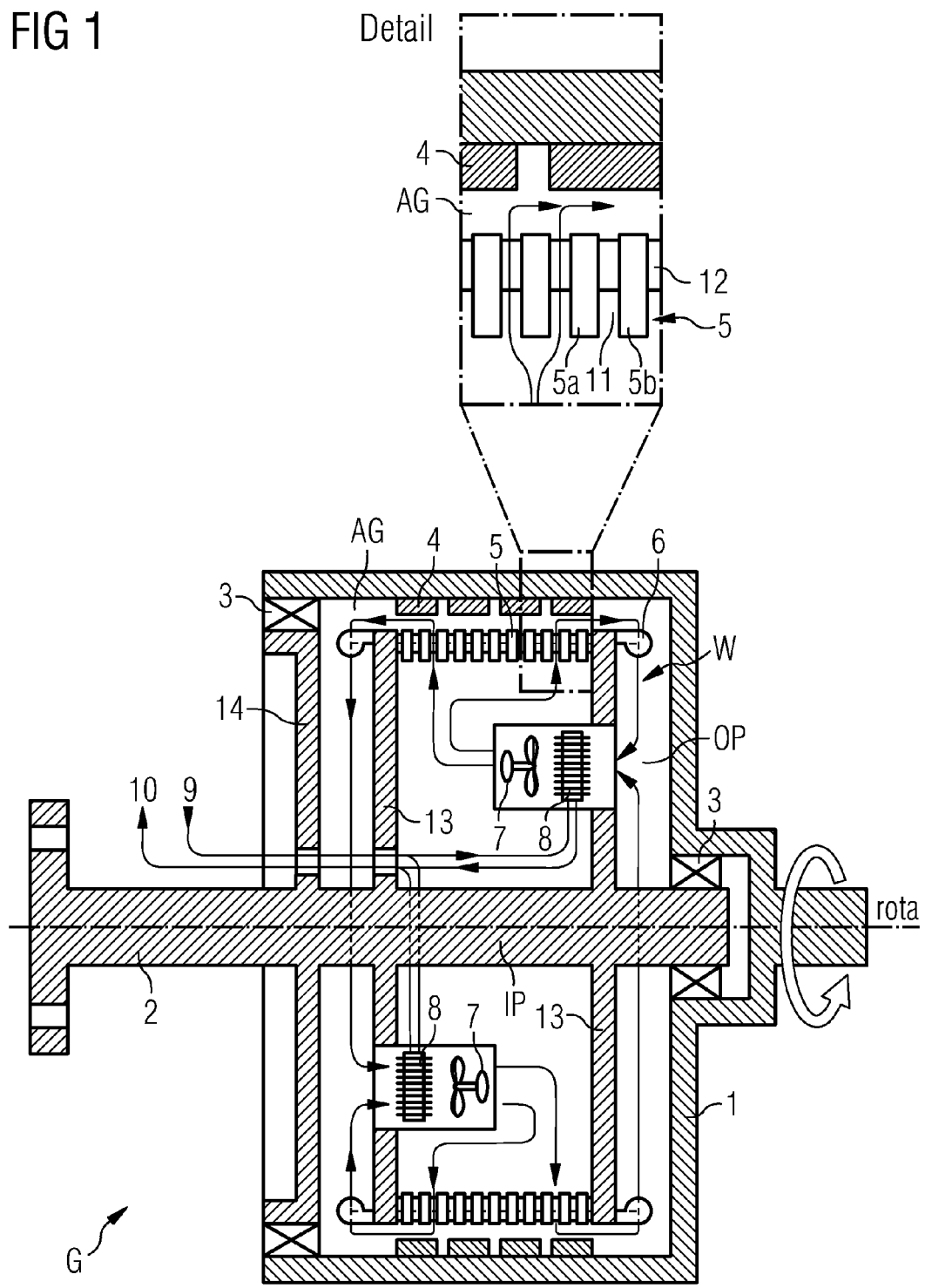
FIG. 1 shows a generator as electrical machine, while the generator is cooled according to the invention.

Referring to FIG. 1, the generator G comprises an outer-rotor 1 and an inner-stator 2. The stator 2 is connected via bearings 3 with the rotor 1.

The rotor 1 wears a number of magnets 4, so the magnets 4 are headed to an air-gap AG, which is between the stator 2 and the rotor 1.

The stator 2 comprises a number of stacked laminate-plates 5, which are used to carry metal-windings 12 of a stator-coil.

The laminate-plates 5 are fixed and kept in position by means for structural support (not shown in detail). This means for structural support may be a number of "T"-shaped bars or any suitable profiles, which penetrates in a preferred embodiment the laminate-plates 5.

The means for structural support are connected with the laminate-plates 5 by welding in a preferred embodiment.

The stacked laminate-plates 5 are positioned by end-plates 13 in relation to a central-part IP of the stator 2. The central-part IP of the stator 2 extends along a rotation-axis rota of the rotor 1.

The end-plates 13 and the structural-support are connected in a preferred embodiment.

So a certain constant air-gap is achieved by help of the end-plates 13.

The laminate-plates 5 show a number of slots on a first side to carry the metal-windings 12 of a stator-coil. The first side is headed in direction to the air-gap AG.

The laminate-plates 5 are normally punched out from a thin steel-foil. The laminate-plates 5 are fixed and placed by the means for structural support as described above.

It is also possible that the means for structural support are connected by welding with a second side of the laminate-plates 5, while the second side is opposite to the first side.

The end-plates 13 are connected with the central-part IP of the stator 2.

A part of the stator-coil exceeds the slots of the laminate-plates 5, forming winding-heads 6 of the stator-coil.

There is a fan 7 for air-cooling-purposes inside the generator G. In this example the fan 7 is connected by attachments with the stator 2, circulating air for cooling-purposes.

There are slits 11 between dedicated laminate-plates 5 to allow the air passing through. In this figure there is a slit 11 located between a first bundle of laminate-plates 5a and an adjacent second bundle of laminate-plates 5b.

The slits 11 are formed between the laminate-plates 5 by distance-pieces, which are inserted between the dedicated laminate-plates 5 while they are stacked.

So the circulation of air is allowed from the fan 7 through the laminate-plates 5 and into the air-gap AG.

The slits 11 are formed and used to control and guide the circulation of the air through the laminate-plates 5.

The two end-plates 13, the central-part IP of the stator 2 and an internal surface OP of the rotor 1 jointly forms a cavity.

Between the inner part IP of the stator 2 and the rotor 1 there is a fixation 14, which carries the bearing 3.

The fan 7 circulates air inside the generator G as shown by help of the arrowed-line along a way w.

The air is blown from the fan 7 through the slits 11 into the air-gap AG, passes along the internal surface OP of the rotor 1 through openings of the end-plates 13 and passes along the central-part IP of the stator 2 back to the fan 7.

As the air also passes the winding-heads an efficient cooling is realised.

In a preferred embodiment there is an air-to-liquid heat-exchanger 8, which interacts or which is connected with the fan 7.

The air-to-liquid heat-exchanger 8 is connected with a cooling-liquid-inlet 9 and with a cooling-liquid-outlet 10, which are used to remove the heat out from the joint cavity via a liquid cooling-medium like water or oil, etc.

Referring to FIG. 2, the outer-rotor 1 carries a number of magnets 4. Laminate-plates 5 of the stator 2 carries a number of windings 12, which are located into slots of the stator 2 as described above.

The laminate-plates 5 are fixed and kept in position by means for structural support. This means for structural support may be a number of "T-bars", which penetrates partly the laminate-plates 5. They are connected with the laminate-plates 5 by welding.

The invention claimed is:

1. An arrangement for cooling of an electrical machine, wherein
   the electrical machine comprises a rotor, a stator and an air-cooling arrangement,
   the stator comprises a plurality of stacked laminate-plates,
   the laminate-plates are positioned and fixed by a structural support and by a plurality of end-plates in relation to a central-part of the stator to form an air-gap between the rotor and the stator,
   an inner cavity is formed by the end-plates, the stator and the laminate-plates:
   an outer cavity, which includes the air-gap, is formed by the end-plates, the stator, and an internal surface of the rotor,
   slits which provide an air path from the inner cavity to the outer cavity via the air-gap of the outer cavity are located between at least a portion of the laminate plates, and
   an air circuit is formed via the air path and openings of the end-plates in order air to circulate air from the inner cavity back to the inner cavity,
   wherein the air-cooling arrangement is connected by attachments with the stator such that the air-cooling arrangement is located within the inner cavity,
   the cooling air-cooling arrangement comprises a fan configured to blow air from the inner cavity through the air circuit such that the blown air passes along the internal surface of the rotor through the openings of the end-plates and passes along the central-part of the stator and back to the air-cooling arrangement.

2. The arrangement according to claim 1, wherein the central-part of the stator extends along a rotation-axis of the rotor.

3. The arrangement according to claim 1, wherein
   the stacked laminate-plates comprise a plurality of slots located on a first side of the laminate-plates, the first side facing toward the air-gap, and
   metal-windings of a stator-coil are arranged in the slots.

4. The arrangement according to claim 3, wherein the structural support comprises a plurality of bars or profiles, which penetrates the laminate-plates and which are connected to the laminate-plates via welding, or
   the structural support are located on a second-side of the laminate-plates, the second-side being opposite to the first-side.

5. The arrangement according to claim 4, wherein the stator-coils exceeds the slots of the laminate-plates to form winding-heads of the stator-coil.

6. The arrangement according to claim 5, wherein the air-cooling arrangement is arranged to circulate air through the air-gap and the winding-heads.

7. The arrangement according to claim 1, where in the air-cooling arrangement is connected with an air-to-liquid heat-exchanger, which is arranged and used to get heat out from the cavity by a cooling-liquid.

8. The arrangement according to claim 1, wherein
the electrical machine is a generator, and/or
the electrical machine is located inside a wind-turbine, and/or
the electrical machine is encapsulated by a shell.

9. The arrangement according to claim 1, wherein the stator is arranged as inner-stator, and the rotor is arranged as outer-rotor.

10. The arrangement according to claim 1, wherein the end-plates and the structural-support are connected.

11. A generator, comprising:
an arrangement for cooling of an electrical machine according to claim 1.

12. The generator according to claim 11, wherein the central-part of the stator extends along a rotation-axis of the rotor.

13. The generator according to claim 11, wherein
the stacked laminate-plates comprise a plurality of slots located on a first side of the laminate-plates, the first side facing toward the air-gap, and
metal-windings of a stator-coil are arranged in the slots.

14. The generator according to claim 13, wherein the structural support are located on a second-side of the laminate-plates, the second-side being opposite to the first-side.

* * * * *